US008427497B1

(12) United States Patent
Chin et al.

(10) Patent No.: US 8,427,497 B1
(45) Date of Patent: Apr. 23, 2013

(54) METHODS AND APPARATUSES FOR PROCESSING CACHED IMAGE DATA

(75) Inventors: Yunsen Chin, Fremont, CA (US); Haohong Wang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 900 days.

(21) Appl. No.: 12/512,963

(22) Filed: Jul. 30, 2009

Related U.S. Application Data

(60) Provisional application No. 61/085,708, filed on Aug. 1, 2008.

(51) Int. Cl.
*G09G 5/36* (2006.01)
*G06F 13/00* (2006.01)

(52) U.S. Cl.
USPC ............................ 345/557; 345/537; 345/538

(58) Field of Classification Search .................. 345/557, 345/537, 538
See application file for complete search history.

(56) References Cited

U.S. PATENT DOCUMENTS

| | | | | |
|---|---|---|---|---|
| 5,678,037 | A * | 10/1997 | Osugi et al. | 345/562 |
| 5,909,225 | A * | 6/1999 | Schinnerer et al. | 345/545 |
| 6,353,438 | B1 * | 3/2002 | Van Hook et al. | 345/552 |
| 6,597,363 | B1 * | 7/2003 | Duluk et al. | 345/506 |
| 6,630,933 | B1 * | 10/2003 | Van Hook | 345/422 |
| 7,039,241 | B1 * | 5/2006 | Van Hook | 382/232 |
| 7,394,288 | B1 * | 7/2008 | Agarwal | 326/39 |
| 7,450,120 | B1 * | 11/2008 | Hakura et al. | 345/421 |
| 2003/0164823 | A1 * | 9/2003 | Baldwin et al. | 345/419 |
| 2004/0078491 | A1 * | 4/2004 | Gormish et al. | 709/247 |
| 2007/0005890 | A1 * | 1/2007 | Gabel et al. | 711/118 |

* cited by examiner

*Primary Examiner* — David T Welch

(57) ABSTRACT

Methods, software, and apparatuses for graphics processing, including caching pixel data of one or more tiles of a graphics surface. Methods generally include setting a caching bit corresponding to the surface, setting tile pattern bits corresponding to tiles in the surface, and when the caching bit is active, storing one or more pixel values in a cache memory. When at least one tile contains pixels having the same value for at least one predetermined parameter, the caching bit and the corresponding tile pattern bits may be active. Apparatuses generally include a pixel memory, a cache memory, and a controller including logic configured to reserve the caching bit, tile pattern bits, and same pixel values in cache memory when the caching bit is active.

18 Claims, 8 Drawing Sheets

FIG. 1
(Conventional)
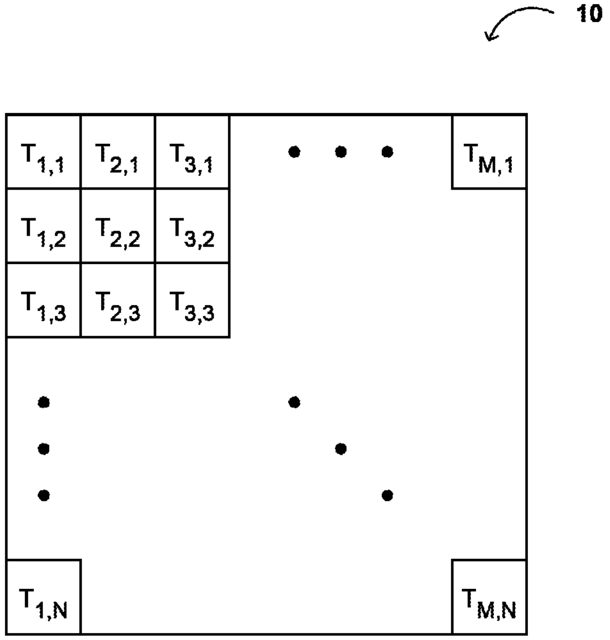

FIG. 2
(Conventional)
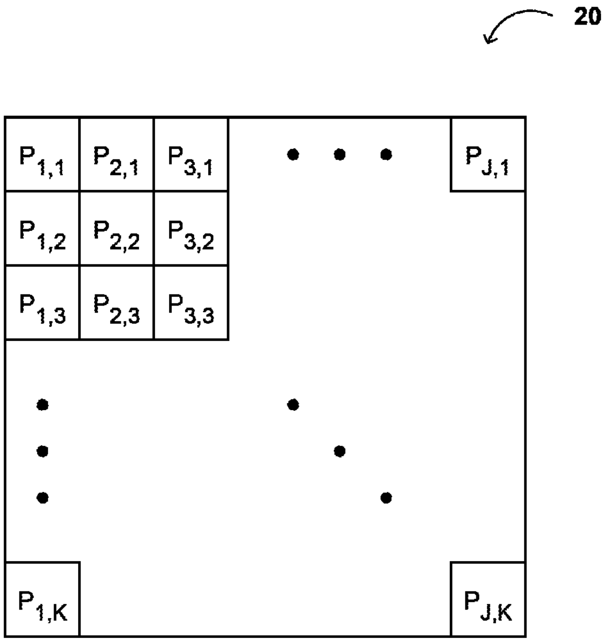

FIG. 3
(Conventional)
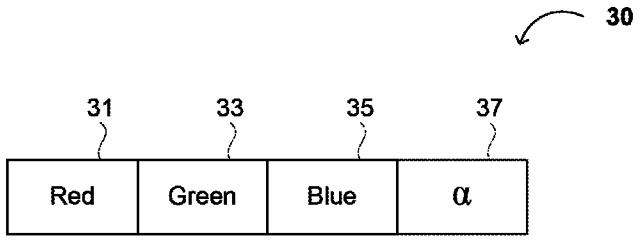

METHODS AND APPARATUSES FOR PROCESSING CACHED IMAGE DATA

RELATED APPLICATIONS

This application claims the benefit of U.S. Provisional Application No. 61/085,708, filed Aug. 1, 2008, incorporated herein by reference in its entirety.

FIELD OF THE INVENTION

The present invention generally relates to the field of graphics processing. More specifically, embodiments of the present invention pertain to methods, software, and apparatuses for processing image data using a cache.

DISCUSSION OF THE BACKGROUND

Some conventional graphics processing schemes include dividing a graphics surface into a plurality of pixels, each pixel representing the smallest dimension or block of information of the graphics surface. Typically, a pixel comprises discrete portions or components representative of the color, transparency, hue, saturation, brightness, chrominance, luminance, intensity, and/or other visual parameters. For example, an RGB pixel is based on an additive color model and comprises portions corresponding to red, green, and blue channel (s). In other examples, an RGBA pixel is based on an additive color model and comprises portions corresponding respectively to red, green, blue, and alpha channels, where the alpha channel represents the transparency of the pixel. In yet other examples, a CMYK pixel is based on a subtractive color model and comprises portions corresponding respectively to cyan, magenta, yellow, and black channels. In other examples, a HSV pixel is based on a transformed RBG color model, where each pixel comprises portions corresponding respectively to hue, saturation, and value channels.

In some conventional digital graphics processes, each channel of a pixel may be represented by or discretized into a digital value. In some examples, a 32-bit RGBA pixel may comprise 8 binary bits for each of a red color component (or channel), a green color component (or channel), a blue color component (or channel), and an alpha channel. In such examples, each channel can be partitioned into one of 256 (or 2^8) values. In other examples, a 32-bit RGBA pixel may comprise 10 binary bits for each of a red color component, a green color component, and a blue color component, and two bits for an alpha channel. In such examples, each of the red, green, and blue channels can be partitioned into one of 1024 values, and the alpha channel can be partitioned into one of four transparency percentage values.

Some conventional graphics processing devices include a pixel memory for storing individual pixels of the graphics surface. When it is desired to perform a mathematical operation on the contents of a pixel, the pixel is generally first read from pixel memory into a memory of the graphics processor, which performs the mathematical operation. Generally, the transformed and/or modified pixel is then written back to pixel memory, or in the case where the pixel is to be displayed on a monitor or other display device, written to a memory associated with the monitor. When a mathematical operation is to be simultaneously performed on more than one pixel of the graphics surface, each pixel is generally read first, before the operation can occur. Thus, some conventional graphics processing devices further divide the graphics surface into a plurality of tiles, each tile representing one or more adjacent pixels. For example, a tile may represent a block of four pixels—two pixels wide by two pixels high. In other examples, a tile may represent a block of sixty four pixels—eight pixels wide by eight pixels high.

Referring to the illustration of FIG. 1, a conventional graphics surface 10 can be divided into M*N tiles, each tile $T_{i,j}$ of which may be representative of one or more pixels. Typically, each tile represents the same number of pixels. For example, each tile may represent 64 pixels. However, it is possible that different tiles in the surface 10 may represent different numbers of pixels.

As shown in the illustration of FIG. 2, a conventional tile 20 can represent J*K pixels, each pixel $P_{m,n}$ of which may have discrete portions or components representative of visual parameters (e.g., definitional color model channels). Typically, the same definitional color model (e.g., set of possible visual parameter values) applies to each pixel of a graphics surface. However, it is possible that different definitional color models may apply to different pixels.

Referring to the illustration of FIG. 3, in some implementations, a conventional pixel 30 (e.g., $P_{m,n}$) can include a red color channel 31, a green color channel 33, a blue color channel 35, and an alpha channel 37. In some digital examples, each of channels 31, 33, 35, and 37 may have the same number of bits, while in other examples, the various channels may have the same or different numbers of bits.

Some conventional graphics processing schemes are not optimized to perform efficient operations on a graphics surface. For example, a conventional graphics surface may have a resolution of 1920 pixels wide by 1080 pixels high and use 32-bit RGBA color model. The graphics surface may be divided into 32,000 tiles, wherein each tile is 8 pixels wide by 8 pixels high. Referring then together to the illustrations of FIGS. 1-3, the graphics surface 10 may be divided into 240 tiles wide by 135 tiles high (i.e., M=240, N=135), each tile 20 being 8 pixels wide by 8 pixels high (i.e., J=8, K=8), and each pixel 30 having 8 bits for each of a red channel 31, green channel 33, blue channel 35, and alpha channel 37. It is to be appreciated that the memory access for a single pixel is 4 Bytes (i.e., 32 bits), that the memory access for one tile (or 64 pixels) is 256 Bytes, and that the memory access for the entire surface (or 32,000 tiles) is 8 MB.

Depending on the graphics surface, it may be common for one or more tiles to have pixels having the same value. For example, each pixel of a tile may be colored red. In some conventional graphics processing schemes, regardless of whether the individual pixels have the same value, the entire tile must be read from, or written to, pixel memory. Thus, for example, although there may be only 4 Bytes of unique information (corresponding to the value of the red pixel), the size of the memory access is still 256 Bytes. Extending the example further, if a graphics surface having a solid color is to be stored in pixel memory, some conventional graphics processing schemes would require a memory access of the full 8 MB. By inefficiently reading and/or writing to pixel memory, system throughput is non-optimal and energy consumption may be unnecessarily high.

SUMMARY OF THE INVENTION

More specifically, embodiments of the present invention pertain to methods and apparatuses for processing image data. More particularly, embodiments of the present invention concern methods, software, and apparatuses for caching pixel values of at least one tile of a graphics surface when the pixels of the tile have a common pixel value.

In some embodiments, a method for processing a graphics surface includes setting a pattern caching bit corresponding to the surface; setting P tile pattern bits; and when the pattern caching bit is in an active state, storing V pixel values in a cache memory. For example, the pattern caching bit may be associated with each graphics surface stored in pixel memory (or other memory, such as a hard disk drive or flash memory). Generally, the graphics surface has a plurality of tiles, and each tile has a plurality of pixels. In addition, each of the P tile pattern bits and each of the V pixel values generally correspond to at least one of the T tiles. The pixel values may comprise one or more channel or component values, such as blue, green, red, or alpha channel values, or alternatively, one or more cyan, magenta, yellow, or black channel values. Additionally or alternatively, the pixel values may comprise one or more transparency, hue, saturation, brightness, intensity, luminosity, or chrominance channel values. The pattern caching bit may indicate when pattern caching (e.g., storing a common pixel value for pixels in one or more tiles in cache memory) is active for a particular graphics surface. For example, and without limitation, the pattern caching bit may have a first state when pattern caching is active and a second state when pattern caching is inactive. In one advantageous embodiment, the pixel values are the same for all channels in each pixel in the tile. In some embodiments, when at least one of the P tile pattern bits corresponds to a plurality of the T tiles of the graphics surface, the P tile pattern bits may be decoded into T tile pattern bits, wherein each of the T tile pattern bits corresponds to one of the T tiles.

In further embodiments, the method can further include initializing the pattern caching bit and each of the P tile pattern bits to an inactive state. Furthermore, each of the V pixel values may be initialized to an initial value. The pattern caching bit may be set to the active state when at least one channel or component of all pixels of at least one of the tiles (and in a particularly advantageous case, all of the channels or components of each pixel) have a common or identical pixel value. In some examples, and without limitation, the pattern caching bit may comprise a logic value (such as a digital "1" or "0" bit) stored in a memory such as a register. In other examples, the pattern caching bit may comprise a signal in a graphics processing unit or other graphics device.

In further embodiments, the method further includes setting at least one of the P tile pattern bits corresponding to the tile(s) having the common or identical pixel value to an active state; and setting one or more of the V pixel values corresponding to the tile(s) having the common or identical pixel value to the common or identical pixel value. In some further embodiments, when all of the pixels of a plurality of the tiles have a common or identical pixel value, at least one of the P tile pattern bits corresponding to the plurality of tiles may be set to an active state, and at least one of the V pixel values corresponding to the tiles having the common or identical pixel value may be set to the common or identical pixel value.

Thus, in some embodiments of the present invention, each of the P tile pattern bits indicates when each of the pixels of one or more of the tiles has the same (i.e., a common and/or identical) value. In some examples, and without limitation, the P tile pattern bits may comprise logic values (such as a digital "1" or "0" bit) stored in a cache memory such as a register or random access memory (RAM). In other examples, the P tile pattern bits may comprise one or more signals in a graphics processing unit or other graphics device. However, other techniques for implementing the pattern caching bit and/or the tile pattern bits are contemplated in accordance with embodiments of the present invention.

In some embodiments, a tile may be read by reading from the cache memory at least one of the V pixel values corresponding to the tile when at least one of the P tile pattern bits corresponding to the tile is set to an active state. In some embodiments, when all of the pixels (or one or more channels or components of the pixels) of a destination tile have a common and/or identical pixel value, the destination tile may be written to the surface by determining whether any of the P tile pattern bits corresponding to the destination tile have an active state, and if at least one tile pattern bit is active, reading the V pixel value(s) corresponding to the destination tile from the cache memory. In some embodiments, an entirety of the surface may be filled with a specific common or identical pixel value by setting the pattern caching bit to an active state; setting each of the P tile pattern bits to an active state; and setting each of the V pixel values to the common or identical pixel value.

In some embodiments (e.g., relating to identifying or generating the data to be stored in the cache memory), a source tile pattern bit corresponding to a source tile may be set and a source cache pixel may be stored in the cache memory. The source tile generally includes a plurality of source pixels, and when all of the source pixels of the source tile have a common or identical pixel value, the source pixel value may correspond to the V pixel value(s) having the common or identical pixel value. In some embodiments, the source tile pattern bit may be set to at least one of the P tile pattern bits corresponding to one of the tiles of the graphics surface, and the V pixel value(s) corresponding to the tile(s) of the graphics surface may be copied to the cache memory. If all of the source pixels of the source tile has a common or identical pixel value, the source tile pattern bit may be set to an active state, and the source pixel value may be set to the common or identical pixel (e.g., color) value.

In some embodiments, a graphics operation may be performed on the source tile and a destination tile of the graphics surface. For example, when the source tile pattern bit is set to an active state and the source pixels have a value comprising a portion indicating that a corresponding pixel of said destination tile is not changed (e.g., an alpha value equal to zero), the graphics operation may include the step of not modifying the destination tile. In some embodiments, when the source tile pattern bit is in an active state, a destination tile of the graphics surface may be filled with the source tile by reading the source pixel value from the cache memory, and writing the source pixel value to each pixel of the destination tile. In some embodiments (e.g., a so-called "non-tile aligned" copy operation), when the source tile pattern bit is set to an active state, a source copy operation that partially fills a destination tile of the graphics surface with a portion of the source tile may include setting at least one of the P tile pattern bits of the graphics surface corresponding to the destination tile to an inactive state, and writing to non-tile-aligned pixels of the destination tile the source pixel value.

The software, architectures, apparatuses, and/or systems generally comprise those that embody one or more of the inventive concepts disclosed herein. For example, one aspect of the invention may relate to a computer-readable medium having encoded thereon a computer executable set of instructions adapted to process a graphics surface comprising a tile array, wherein each tile in the array comprises a plurality of pixels that may be stored in pixel memory (or other memory, such as a hard disk drive or flash memory). In general, the instructions comprise determining whether each of the plurality of pixels in one or more tiles in the array has a common or identical value for one or more predetermined parameters, channels or components, setting a caching bit corresponding to the surface to a first value when each pixel of at least one of the one or more tiles has the same value, setting one or more tile pattern bits to a first state when the caching bit has the first value, the one or more tile pattern bits corresponding to at least one of the one or more tiles in which each pixel has the same value, and storing in cache memory the value of the pixels for each of the one or more tiles in which each pixel has the same value in accordance with the caching bit and the one or more tile pattern bits.

In a further embodiment, when the caching bit has the first value, the instructions may further be adapted to provide the one or more tiles having corresponding pattern bits set to the first value to an image processing function by retrieving the value of the pixels from the cache memory. When the caching bit has the first value, the instructions may further comprise retrieving the value of the pixels from the cache memory for each tile having corresponding pattern bits set to the first state, and providing the value of the pixels for each such tile to an image processing function. In some embodiments, the instructions may further comprise setting the caching bit to a second state when each of the tiles contains at least two pixels having different values for at least one of the predetermined parameters, channels or components. In one example, the instructions set the caching bit to a second state when each of the tiles contains at least two pixels having different values for each of the predetermined parameters, channels or components. Thus, in some embodiments, the instructions may further comprise retrieving the value of each of the pixels from a pixel memory and providing each of the pixel values to an image processing function for each of the tiles having corresponding tile pattern bits set to the second state, storing the plurality of pixels of at least one of the one or more tiles of the graphics surface in a pixel memory, and/or performing the image processing function using the plurality of pixels.

A still further aspect of the invention relates to an image processing apparatus, comprising a pixel memory, a cache memory, and a controller configured to operate on a graphics surface comprising T tiles, each tile comprising a plurality of pixels stored in the pixel memory. The controller generally includes logic configured to reserve in the cache memory a caching bit, P tile pattern bits, and an array of pixel values, wherein each of the P tile pattern bits corresponds to at least one of the T tiles of the graphics surface. The controller logic may be further configured to determine whether each of the pixels of one or more of the T tiles has a common or identical value, and when each of the pixels of at least one of the T tiles has the same value, set each of the P tile pattern bits corresponding to such tile(s) to an active state and storing the common or identical pixel value in the cache memory. In one embodiment, the controller further includes logic configured to initialize the caching bit and each of the tile pattern bits to an inactive state.

The present invention provides for improved memory access bandwidth during graphics operations by reducing the tile memory access to a single pixel access if the tile is determined to have a predetermined pattern. In addition, the invention provides for totally skipping a tile memory access if the pixel values of the destination tile do not change. These and other advantages of the present invention will become readily apparent from the detailed description of preferred embodiments below.

BRIEF DESCRIPTION OF THE DRAWINGS

FIG. 1 is a diagram showing a conventional graphics surface comprising a plurality of tiles.

FIG. 2 is a diagram showing a conventional tile of FIG. 1 comprising a plurality of pixels.

FIG. 3 is a diagram showing a conventional pixel of FIG. 2 comprising red, green, blue, and alpha channel portions.

DETAILED DESCRIPTION

Figure 4:
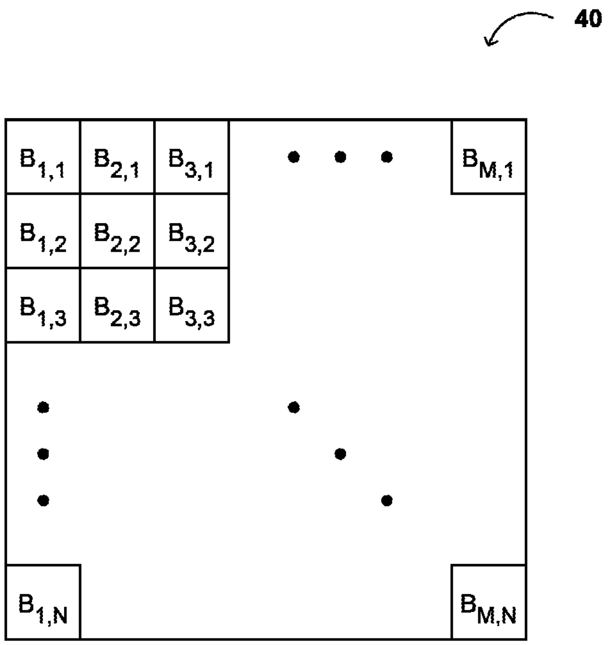
FIG. 4 is a diagram showing an exemplary array of tile pattern bits in accordance with embodiments of the present invention.

Reference will now be made in detail to various embodiments of the invention, examples of which are illustrated in the accompanying drawings. While the invention will be described in conjunction with exemplary embodiments provided below, the embodiments are not intended to limit the invention. On the contrary, the invention is intended to cover alternatives, modifications and equivalents that may be included within the scope of the invention as defined by the appended claims. Furthermore, in the following detailed description, numerous specific details are set forth in order to provide a thorough understanding of the present invention. However, the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, algorithm, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

All of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device) that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

All of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "generating," "determining," "manipulating," "transforming," "displaying," "setting," "storing," or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Also, for convenience and simplicity, the terms "data," "code," "data stream," "waveform," "signal," and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

For convenience and simplicity, one or more examples below may use the term "graphics surface" to refer to a conventional graphics surface as shown in the exemplary illustration of FIG. 1. Also, for convenience and simplicity, the term "tile" may refer to a conventional tile of a graphics surface as shown in the exemplary illustration of FIG. 2. Also, for convenience and simplicity, the terms "pixel" and/or "component pixel" may refer to a conventional pixel as shown in the exemplary illustration of FIG. 3. Also, for convenience and simplicity, reference may be made below to a conventional graphics surface having 1920*1080 pixels, the graphics surface further being divided into tiles having 8 pixels wide by 8 pixels high. In such examples, the value of M may be 240, the value of N may be 135, the value of J may be 8 and the value of K may be 8. However, any such reference to conventional "graphics surface," "tile," or "pixel", or exemplary configurations thereof, is not meant to limit the scope of the invention. Rather, embodiments of the present invention contemplate any configuration of graphics surfaces, tiles, and/or pixels.

The invention, in its various aspects, will be explained in greater detail below with regard to exemplary embodiments.

Exemplary Architectures for Processing a Graphics Surface

FIG. 4 shows an array 40 of P tile pattern bits B(1,1) . . . B(M,N). The tile pattern bits indicate a particular characteristic or property of one or more tiles in the graphics surface (e.g., whether each of the pixels in one or more of the tiles has a common and/or identical value). Referring to the exemplary illustration of FIG. 4, in some examples, and without limitation, each of the tile pattern bits B(1,1) . . . B(M,N) of an array 40 may correspond to one or more tiles of the graphics surface. In some implementations, there may be a direct correlation between the tile pattern bits and the tiles of the graphics surface. For example, and without limitation, tile pattern bit B(1,1) of FIG. 4 may correspond to tile T(1,1) of FIG. 1. Similarly, tile pattern bit B(2,3) of FIG. 4 may correspond to tile T(2,3) of FIG. 1. However, in some other implementations, there may not be a direct correlation between the tile pattern bits and the tiles of the graphics surface. Thus, in accordance with some embodiments of the present invention, an individual tile pattern bit may correspond to more than one tile of the graphics surface. For example, and without limitation, tile pattern bit B(1,1) may correspond to tiles T(1,1), T(1,2), T(2,1) and T(2,2), or other sub-array within the graphics surface (such as one or more rows or columns, or portions thereof). Alternatively, the tile pattern bits may be coded or may have more than 2 states (e.g., the tile pattern bits are ternary), in which case the number of tile pattern bits may be smaller than the number of corresponding tiles.

Thus, source coding or data compression may be used to improve storage and transmission performance of the plurality of tile pattern bits associated with the graphics surface. For example, and without limitation, it may be desirable to compress T number of tile pattern bits (each of which directly correlates to one of T tiles of the graphics surface 10) into a smaller number P of tile pattern bits. Therefore, in some implementations, the P tile pattern bits (as illustrated in FIG. 4) may be decoded into T tile pattern bits (where each of the T tile bits correspond to one tile of the graphics surface 10 as illustrated in FIG. 1). In some examples, and without limitation, run-length encoding, entropy encoding, or linear predictive coding may be used to compress the T tile pattern bits into P tile pattern bits. However, it is to be appreciated that other encoding algorithms may be used in accordance with some embodiments of the present invention.

Figure 5:
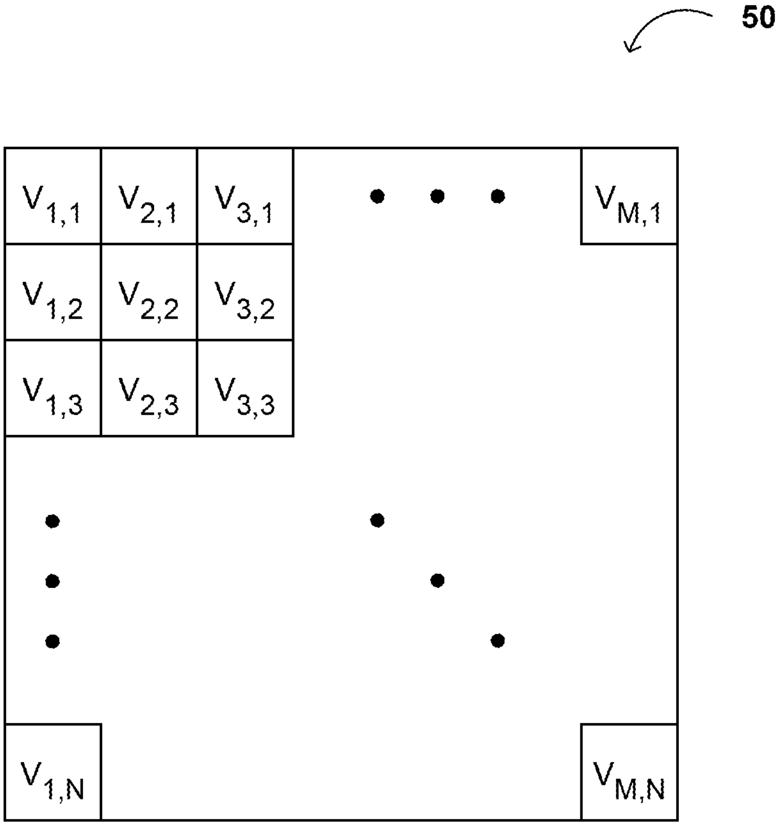
FIG. 5 is a diagram showing an exemplary array of pixel values in accordance with embodiments of the present invention.

FIG. 5 shows an array 50 of V pixel values V(1,1) . . . V(M,N). Generally, a pixel value stored in the array 50 is a value that is common and/or identical among pixels in one or more tiles (or predetermined portion[s] of a tile) of the graphic surface. In addition, the pixel values V(1,1) . . . V(M,N) are generally stored in cache memory. Referring to the exemplary illustration of FIG. 5, in some examples, and without limitation, each of the V pixel values may correspond to one or more tiles of the graphics surface, and may indicate one or more values for each pixel of the corresponding tile(s). In some implementations, the pixel values may comprise a representation of a blue-green-red-alpha channel value or an intensity-luminosity-chrominance channel value. For example, and without limitation, if the graphics surface comprises component pixels defined by an RGBA color space model, each cache pixel may have a portion corresponding respectively to a red channel, a green channel, a blue channel, and an alpha channel. In some implementations, the cache pixel may have the same format as the pixels of the graphics surface. In other implementations, the cache pixel may have a compressed or transformed format.

It is to be appreciated that there are several ways of representing the graphics surface. Referring to the exemplary illustrations of FIGS. 1-3, conventional graphics processing schemes can include representing graphics surface 10 by a plurality of M*N tiles, each tile 20 comprising a plurality of J*K pixels, each pixel 30 comprising one or more color model channels 31, 33, 35, 37. Embodiments of the present invention further provide representing a graphics surface 10 by a plurality of P tile pattern bits 40, as illustrated in the example of FIG. 4, and a plurality of V pixel values, as illustrated in the example of FIG. 5. The tile pattern bits 40 generally indicate when one or more tiles of the graphics surface 10 contain pixels each having the same value for one or more channels or components. In one advantageous embodiment, the tile pattern bits 40 indicate when all of the pixels in one or more corresponding tiles of the graphics surface 10 have the same value for all channels or components of the pixels. Once identified or determined, the common and/or identical values of the pixels in a tile so indicated by an active tile pattern bit may be stored in the pixel values 50.

It may be desirable to set the pattern caching bit, the tile pattern bits 40, and/or the pixel values 50 to a first or initial state. Thus, in some implementations, various methods may further include initializing the pattern caching bit to an inactive state, and initializing each of the P tile pattern bits to an inactive state. In some implementations, the inactive state of the pattern caching bit may correspond to a digital low logic state. In some implementations, the inactive state of the P tile pattern bits may correspond to a digital high logic state. The inactive state of the pattern caching bit may be the same or different than the inactive state of the P tile pattern bits. For example, and without limitation, the inactive state of the pattern caching bit may correspond to a digital low while the inactive state of each of the P tile pattern bits may correspond to a digital high. In some embodiments, the value or state of the pattern caching bit may result from a mathematical or logical operation on one or more tile pattern bits. For example, and without limitation, the pattern caching bit may be the result of performing a digital "OR" operation on each of the tile pattern bits corresponding to a given graphic surface. In some examples, and without limitation, the pattern caching bit may be set to an inactive state by latching the inactive state into a memory or register. Similarly, in some examples, each of the P tile pattern bits can be set to an inactive state by writing the inactive state to memory.

In some implementations, each of the V pixel values may also be initialized to an initial value. For example, and without limitation, each of the V pixel values 50 may be initialized to a 100% black color. In other examples, when the pixels have an alpha channel, only the alpha channel portion of each of the V pixel values are initialized to a 100% transparent value. It is to be appreciated that other methods of initializing the pattern caching bit, the P tile pattern bits, and/or the V pixel values are contemplated in accordance with some embodiments of the present invention.

In some implementations, the method may further include setting the pattern caching bit to the active state when each of the pixels of at least one of the tiles has a common or identical pixel value. For example, and without limitation, a processor or other digital logic may be configured to select a first tile of the graphics surface and determine whether all of the pixels of that first tile have the same value. If the pixels do have the same value, the pattern caching bit may be set to the active state. If the pixels do not have the same value, the logic may then proceed to select a next tile of the graphics surface and perform a similar determination. In other examples, a mathematical correlation algorithm may be performed on each of the tiles of the graphics surface to determine whether the pixels for each tile have the same value. It is to be appreciated that other methods for determining whether one or more tiles comprise pixels having the same value are contemplated in accordance with some embodiments of the present invention.

If it is determined that a tile comprises pixels all having the same value (e.g., one or more color values), in some implementations, at least one of the P tile pattern bits 40 corresponding to the tile is set to an active state and at least one of the V pixel values 50 corresponding to the tile is set to the common or identical pixel value. In one implementation, each of the tile pattern bits and the pixel values correspond to the tiles in a unique 1:1 relationship. For example, and without limitation, if each pixel of tile T(2,2) of graphics surface 10 is a fully opaque yellow color, tile pattern bit B(2,2) as illustrated in FIG. 4 may be set to an active state, and the fully opaque yellow color value may be written to pixel V(2,2) as illustrated in FIG. 5. In other examples, if each pixel of tiles T(1,1), T(2,1) and T(3,1) of graphics surface 10 are a 50% transparent purple, tile pattern bits B(1,1), B(2,1) and B(3,1) may be set to an active state and the 50% transparent purple color value may be written to each of pixel values V(1,1), V(2,1) and V(3,1).

When the pixel value of a uniform color tile is cached, a significant reduction in the amount of memory which must be accessed is realized. In such implementations, the entire tile need not be accessed from pixel memory. Thus, an operation for reading a tile of the graphics surface 10 can include reading one of pixel values 50 corresponding to the tile when one of the tile pattern bits 40 corresponding to the tile is set to an active state. For example, and without limitation, a read operation may first determine whether a tile has pixels which are all the same value. In some implementations, this may be done by reading the tile pattern bit corresponding to the tile and comparing it to an active state. If the tile pattern bit is active (i.e., set to an active state), instead of reading all of the pixels of the tile from pixel memory, the operation access the corresponding pixel value from cache memory. Such methods may significantly increase the throughput of graphics processing processes.

Other graphics operations may also realize memory access savings. For example, in some implementations, an operation for writing a tile of the graphics surface 10, when each of the pixels of the tile comprises a common or identical pixel value, can include setting one of the P tile pattern bits 40 corresponding to the tile to an active state and setting one of the V pixel values 50 corresponding to the destination tile to the common or identical pixel value. For example, and without limitation, when a tile having pixels each comprising a common or identical value is to be written to pixel memory (e.g., for subsequent display, mathematical operation[s] or other graphics processing), a write operation can include activating at least one of the tile pattern bits 40 corresponding to the tile and setting at least one of the pixel values 50 equal to the common or identical value. As such, instead of conventional graphics operations which require writing each of the pixels of the tile into pixel memory, only the tile pattern bit and the cache pixel value(s) need be written.

Further, in some implementations, an operation for filling the entirety of the surface with a common or identical pixel value can include setting the pattern caching bit to an active state, setting each of the P tile pattern bits 40 corresponding to the graphics surface to an active state, and setting each of the V pixel values 50 corresponding to the tiles to the common or identical pixel value. For example, and without limitation, a graphics surface having 1920 32-bit pixels wide by 1080 32-bit pixels high and divided into 32,000 tiles may be uniformly filled with a common or identical pixel value by activating the pattern caching bit, activating each of the P tile pattern bits 40, and writing the common or identical pixel value to each of the V pixel values 50 in cache memory. Alternatively, the graphics surface can be filled with a common or identical pixel value by activating the pattern caching bit, activating first and second tile pattern bits, where the first tile pattern bit corresponds to a tile to be repeated across the entire graphics surface and the second tile pattern bit indicates that the tile is to be repeated for the entire graphics surface, and writing the common or identical pixel value to the pixel value in the array 50 corresponding to the tile to be repeated. Where conventional graphics processing schemes generally require a memory access of 8 MB (or 1920×1080×4 Bytes) for such a surface, the total memory access would be about 132 kB in the first case (i.e., 1 bit for the pattern caching bit plus 4 kB for the tile pattern bit array plus 128 kB for the cached pixel values). In the second case, most or nearly all of the tile pattern bit array bandwidth is saved, but the access for the cached pixel values remains the same (although some savings in writing the pixel values to the cache memory is realized). As can be understood by those skilled in the art, memory access savings may be realized in all or nearly all cases when a tile pattern bit and/or a cached pixel value correspond to more than one tile of the graphics surface, or a cached pixel value corresponds to more than one destination pixel value in a graphics processor operation (e.g., in a pattern-to-destination graphics operation).

Some graphics operations, such as blending operations, involve performing a mathematical operation on a destination tile with the contents of a source tile. Therefore, the present invention may be practiced on both a tile of the graphics surface and a source tile. In some implementations, the method may further include setting a source tile pattern bit corresponding to a source tile comprising a plurality of source pixels, and storing a source cache pixel corresponding to the source tile in the cache memory. Thus, the pixel values of both a destination tile and a source tile may be stored in cache memory. For example, and without limitation, each source tile may have an associated source tile pattern bit and source cache value. In some implementations, if each of the source pixels of the source tile has a common or identical pixel value, the source tile pattern bit may be set to an active state and the source cache pixel may be set to the common or identical value (e.g., color value).

For some source-destination operations, it may be desirable to first populate the source tile with the contents of a destination tile in which all pixels have the same value. Thus, in some implementations, an operation for initializing a source tile with the contents of a tile of the graphics surface can include setting the source tile pattern bit to an active state and copying one of the V pixel values corresponding to the destination tile(s) to the source pixel value. Conversely, in some implementations, when it is desired to copy or fill a destination tile with the contents of a source tile in which all pixels have the same value, an operation can include reading the source pixel value from the cache memory and writing to each pixel of the destination tile the source pixel value. In some further implementations, instead of writing to each pixel of the destination tile, the tile pattern bit corresponding to the destination tile can be set to an active state and the cached pixel value corresponding to the destination tile can be set to the source pixel value.

In some source-destination operations, the source tile(s) and the destination tiles may not be fully aligned (i.e., less than all of the pixels of the destination tile are to be filled with the contents of a source tile). Thus, in some implementations, an operation for partially filing a destination tile of the graphics surface with a source tile in which all pixels have the same value may include setting the tile pattern bit of the graphics surface corresponding to the destination tile to inactive, and writing to non-tile-aligned pixels of the destination tile the source pixel value (e.g., from pixel memory). The tile pattern bit corresponding to the destination tile should be inactive because the pixels of the tile will not necessarily have the same values (i.e., some of the pixels of the destination tile will be filled with the cached pixel value, while the remainder will not as a result of the lack of tile alignment).

Memory access may further be reduced by skipping a graphics operation when it can be determined from the source tile that the operation will have no effect. Thus, in some implementations, when the source tile pattern bit is active and the source pixel value indicates that a corresponding pixel of said destination tile is not changed (e.g., the pixel includes an alpha value equal to zero), the graphics operation may include the step of not modifying the destination tile. For example, and without limitation, if a source tile is to be copied to a destination tile and it can be determined from the value of the source cache pixel that the operation will not affect the pixels of the destination tile, the entire operation may be skipped. In some implementations, as described above, the portion or component of the source pixel that includes such an indication may be an alpha channel. For example, if a destination tile is to be blended with a source tile having a source pixel (stored in cache memory) with an alpha channel value equal to 100% transparent, the entire operation can be skipped because blending the destination tile with the uniform source tile will not change the contents of the destination tile.

There are other conventional graphics operations other than the copy, fill, and blend operations discussed herein. It is within the abilities of those skilled in the art to adapt the pattern caching bit, the tile pattern bits, and the cached pixel values of the present invention to optimize any number of graphics operations.

Exemplary Image Processing Apparatuses

Figure 6:
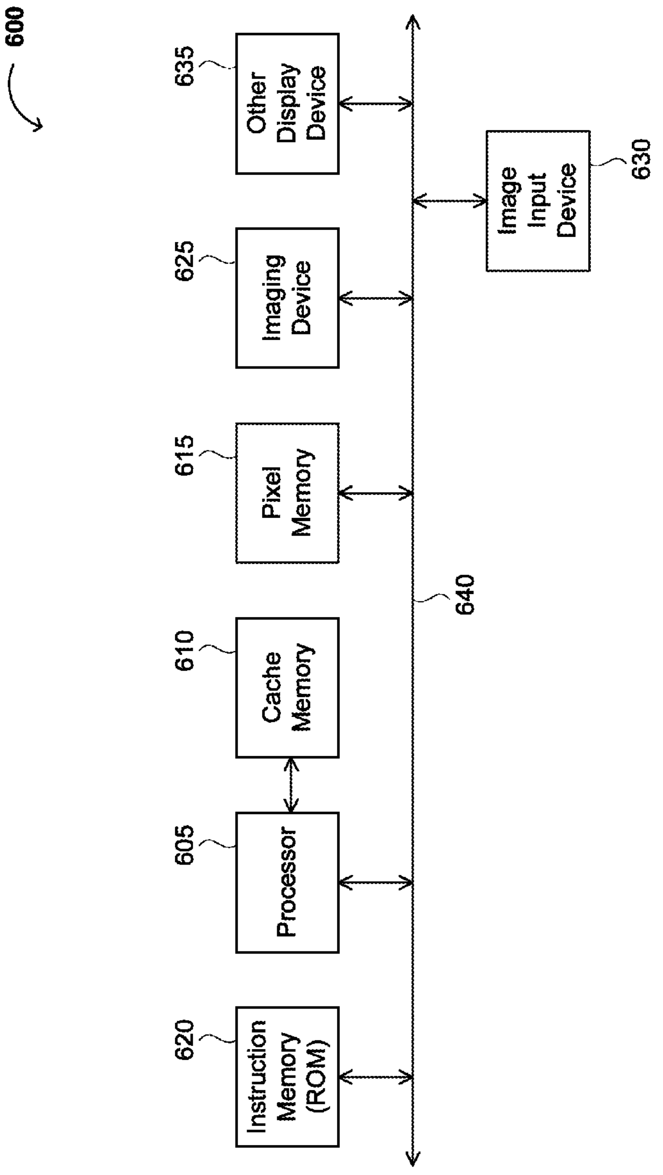
FIG. 6 is a block diagram showing an exemplary imaging apparatus in accordance with embodiments of the present invention.

Referring now to the exemplary illustration of FIG. 6, and without limitation, a generic imaging apparatus 600 generally includes some hardware, firmware and (optionally) software in which some embodiments of the present invention may be implemented. In some embodiments, imaging apparatus 600 may comprise functional blocks such as a processor/controller 605, cache memory 610, and pixel memory 615.

Processor 605 executes image processing instructions, optionally among other instructions, stored in processor instruction memory 620. Processor 605 may comprise a general purpose processor or dedicated image processor, among other types of signal processors and/or logic circuits described herein. In some embodiments, processor 605 may form the core of an image processing application specific integrated circuit (ASIC) or system on a chip (SoC).

Processor 605 may include logic configured to reserve in cache memory 610 a caching variable (or bit), a plurality of tile pattern variables (or bits) corresponding to at least one tile of the graphics surface, and one or more pixel values (e.g., when the caching variable or bit indicates that pattern caching is active). Processor 605 may further be configured to initialize the caching variable to a first value and initialize each of the pattern variables to a first value. In some implementations, processor 605 may further include logic configured to determine whether each of the pixels of one of the tiles of the graphics surface has one or more common and/or identical values. If at least one of the tiles comprises pixels all having the same value(s), processor 605 may set each of the pattern variables corresponding to such tile(s) to a second value (e.g., indicating that tile pattern and/or pixel value caching is active), and store the common and/or identical value(s) in cache memory 610.

In some implementations, cache memory 610 may be incorporated in and/or physically close to processor 605. Cache memory 610 may provide temporary storage for part or all image data or other data required by instructions being executed by processor 605. For example, and without limitation, cache memory 610 may provide temporary storage of one or more of the pattern variables. In some embodiments, cache 110 may comprise static random access memory (SRAM).

Pixel memory 615 may store all or part of the pixel data pertaining to a graphics surface, which, in some embodiments, may be supplied by a personal computer or other device through a communication interface (not shown). Image data stored in pixel memory 615 may be randomly accessed and/or modified by processor 605. In some embodiments, pixel memory 615 may comprise dynamic random access memory (DRAM), a hard disc, an optical storage medium (e.g., CD-ROM, DVD, and/or any similar medium), etc.

In some embodiments, pixel memory 615 may store image data in the form of high level image data or descriptions (e.g., any of the various page description languages [PDLs] known to those skilled in the art) or low level image pixel data (e.g., bitmap or raster image data stored in one dimensional lines or rows of an image). In some embodiments, image processing instructions executed by processor 605 may convert or otherwise modify image data stored in pixel memory 615. In some embodiments, pixel memory 615 may also store image processing parameters (e.g., parameters pertaining to image processing speed or image quality). These parameters may be generated automatically by executing image processing instructions (e.g., by detecting optimal run lengths for memory) and/or manually (e.g., by user input data entered through a mouse or keyboard coupled to a personal computer in response to a graphical query generated by a printing program).

In some implementations, imaging apparatus 600 may further comprise other functional blocks, including processor instruction memory 620, imaging device 625, display device 635, image input device 630, and bus 640. Image processor 605, cache memory 610, pixel memory 615 and image processor instruction memory 620 may reside in imaging equipment or in equipment external to the imaging equipment, such as a personal computer or other device. Alternatively, image processor 605, cache memory 610, pixel memory 615 and image processor instruction memory 620 may be distributed, as opposed to co-located.

Processor instruction memory 620 may store image processing instructions for execution by processor 605. Processing instructions may comprise firmware and/or software instructions. In some embodiments, processor instruction memory 620 may comprise read only memory (ROM). In addition, image processing instructions according to the present invention may comprise only a subset of the image processing instructions stored in instruction memory 620. For example, some image processing instructions may be dedicated to rasterizing a high level page description of an image.

Imaging device 625 may comprise, for example, an image generator having a scan path (e.g., an ink-jet printer, a line printer, a laser printer, etc.). Input device 630 may provide image data to imaging apparatus 600. Input device 630 may comprise, for example, and without limitation, a personal computer, camera, cellular or mobile phone, personal digital assistant (PDA), scanner, etc., communicating over a local or network connection. Display device 630 may receive and cause to be displayed a graphics surface from pixel memory 615 and/or processor 605. Display device 635 may comprise, for example, and without limitation, a display monitor (e.g., a computer monitor, a camera display, a cellular, mobile phone or PDA display, a television screen, a video memory, etc.) in communication therewith.

Bus 640 may comprise a communication link between the functional blocks as illustrated in FIG. 6. In some embodiments, bus 640 may comprise one or more localized and/or extended (e.g., network) busses for transmission of data, addresses, instructions and other information. The particular implementation of the data bus configuration is not necessarily critical to the present invention.

Exemplary Software for Processing a Graphics Surface

Further embodiments of the present invention include algorithms, computer program(s) and/or software, implementable and/or executable in a workstation or a general purpose or application specific computer configured to perform one or more steps of the method and/or one or more operations of the hardware. Thus, further aspects of the invention relate to algorithms and/or software that implement the above method(s). For example, and without limitation, the invention may further relate to a computer program, computer-readable medium or waveform containing a set of instructions which, when executed by an appropriate processing device (e.g., a signal processing device, such as a microcontroller, microprocessor or DSP device), is configured to perform one or more of the above-described methods and/or algorithms.

Thus, in some aspects, a computer-readable medium may have encoded thereon a computer executable set of instructions adapted to process a graphics surface having a plurality of tiles. Each tile may have a plurality of pixels and may be stored in a memory (e.g., a pixel memory). The instructions may include determining whether all of the pixels in any of the tiles of the graphics surface each have the same value(s) for one or more predetermined parameters, channels, and/or components. If any of the tiles have pixels all having the same value(s), the instructions may further include setting a caching bit corresponding to the graphics surface to a first value, setting one or more tile pattern bits (where each tile pattern bit corresponds to one or more tiles of the graphics surface) to a first state when the caching bit has the first value, and storing the value of those pixels in cache memory. In some implementations, if none of the tiles have pixels all having the same value(s), the instructions may include setting the caching bit to a second value. However, when a tile has pixels all having the same value, the corresponding tile pattern bit(s) may be set to a first state.

The instructions may further include providing the tiles to an image processing function. In some implementations, when the caching bit is set to the first value, the value of the pixels in a tile in which the corresponding tile pattern bit(s) are set to the first state may be retrieved from cache memory, and the value of the pixels for the one or more tiles having corresponding pattern bits set to the first state may be provided to the image processing function. If the caching bit is not set to the first value, or if the tile pattern bit(s) are not set to the first state, the instructions may further be adapted to provide the corresponding tiles to the image processing function by retrieving the value of the pixels from the pixel memory. In other and/or additional implementations, the instructions may further include storing the plurality of pixels of at least one of the tiles of the graphics surface in pixel memory and performing an image processing function using the plurality of pixels stored in pixel memory; setting the caching bit to a second state when each of the tiles contains at least two pixels having different values for at least one of the one or more predetermined parameters, channels or components; and/or retrieving the value of each of the pixels from a pixel memory and providing each of the pixel values to an image processing function for each of the tiles having corresponding tile pattern bits set to the second state. Alternatively or additionally, the instructions may be further adapted to store the pixels of at least one of the tiles of the graphics surface in a pixel memory, and/or perform an image processing function using the pixels in the pixel memory.

Exemplary Methods for Processing a Graphics Surface

Figure 7:
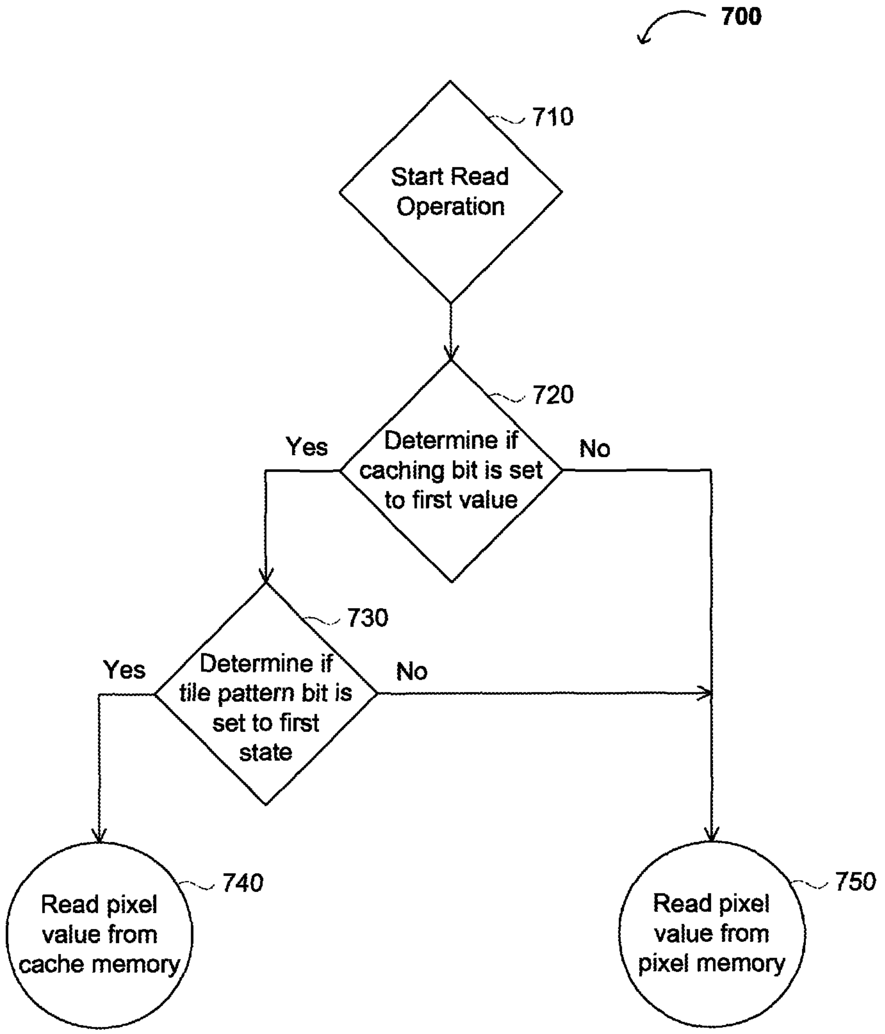
FIG. 7 is a flow chart showing an exemplary method of reading a tile in accordance with embodiments of the present invention.

Referring to the exemplary illustration of FIG. 7, and without limitation, an operation for reading the pixels of a tile of a graphics surface 700 begins at step 710 with the start of a reading operation, and can include the step 720 of determining if the caching bit is set to a first value (e.g., an active state). In such examples, the caching bit can identify whether the method in accordance with the present invention is enabled for the graphics surface. In other examples, the caching bit can identify whether the method in accordance with the present invention is enabled for graphics operations generally. If the caching bit is not set to the first value (e.g., caching is not active, which may be indicated by the caching bit having a second state complementary to the first state), the operation may include the step 750 of reading the pixel values from pixel memory. However, if the caching bit is set to the first value (e.g., caching is active), the method generally includes the step 730 of determining whether the tile to be read has corresponding tile pattern bit(s) which are set to a first or active state (e.g., indicating that each pixel of the tile has one or more common and/or identical values for a predetermined parameter, channel, or component). In one implementation in which the tile pattern bit is active, all parameters, channels, and/or components of each pixel in the tile have the same value(s) as the other pixels in the tile. If the tile pattern bit(s) are set to the first state, then the method generally includes the step 740 of reading the pixel value(s) of that tile from cache memory. If however, the tile pattern bit(s) are not set to the first state (e.g., indicating that tile pattern and/or pixel value caching is inactive), then the method generally reads the pixel values from pixel memory (step 750).

Figure 8:
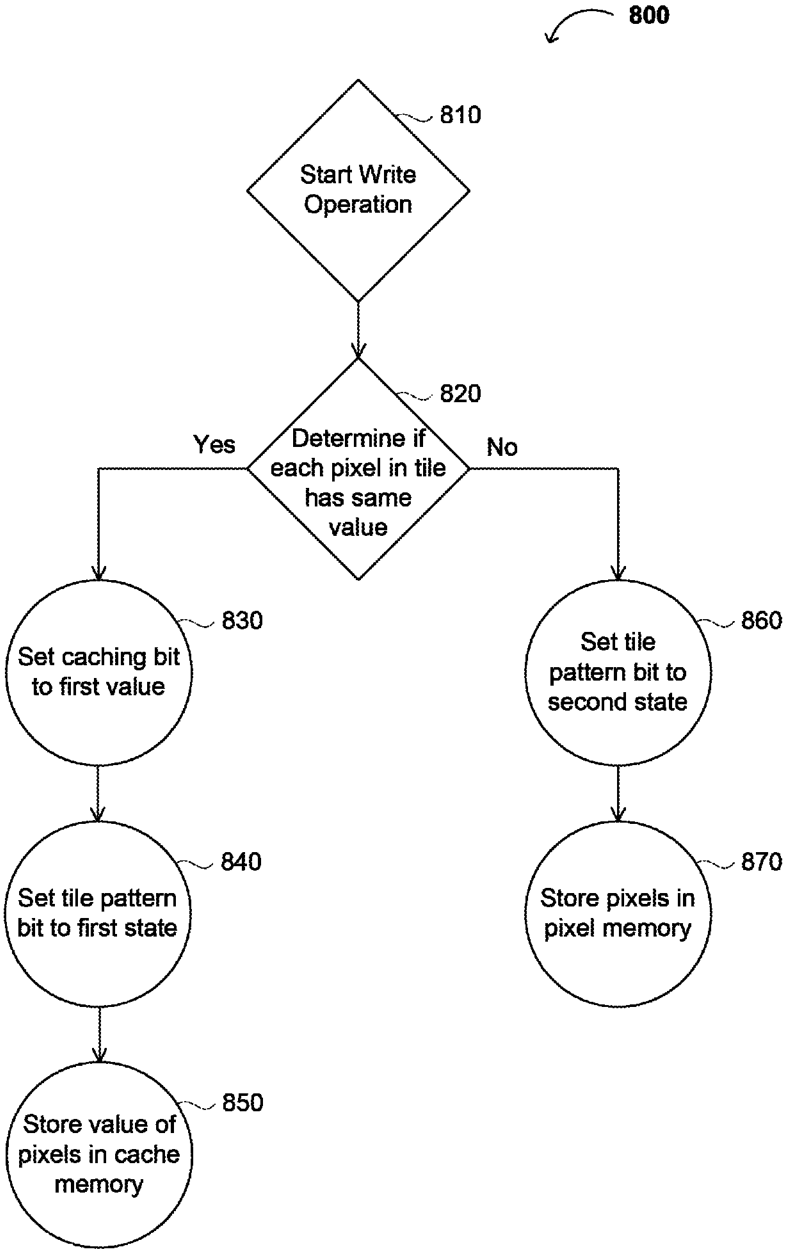
FIG. 8 is a flow chart showing an exemplary method of writing a tile in accordance with embodiments of the present invention.

Referring to the exemplary illustration of FIG. 8, and without limitation, an operation for writing the pixels of a tile of a graphics surface 800 begins at step 810 with the start of a writing operation, and can include the step 820 of determining if each pixel in the tile has one or more common and/or identical values for a predetermined parameter, channel, and/or component (and in one implementation, all parameters, channels, and/or components). If the pixels all have the same value(s), the write operation generally sets the caching bit to a first value (e.g., indicating that tile pattern caching is active; see step 830), and the tile pattern bit(s) corresponding to such tile(s) are set to a first (e.g., active) state in step 840. The write operation then generally stores the common and/or identical value(s) of the pixels of the tile in cache memory in step 850. However, if in step 820 it is determined that at least some pixels do not have any common and/or identical values, the operation 800 may then set the tile pattern bit(s) corresponding to such tile(s) to a second state (see, e.g., step 860), and store each pixel of the tile in pixel memory (see, e.g., step 870).

When all of the pixels of the tile have a common and/or identical value, only one pixel value needs to be read and/or written (e.g., from/to cache memory). This is an improvement over conventional reading and writing operations where, regardless of whether each of the pixels of the tile have common and/or identical values, all of the pixels values need to be read and/or written (e.g., from/to pixel memory).

The invention may be implemented in part or in full by programming firmware and/or software for one or more suitable general-purpose or application specific computers having appropriate hardware therein. The programming may be accomplished through the use of a computer-readable program storage device having encoded thereon a program of instructions executable by the computer for performing all or a portion of the operations in certain embodiments of the invention.

A program storage device or computer readable media may take the form of any fixed or removable storage medium that exists now or is subsequently developed, e.g., electric, magnetic, optical storage media. The program of instructions for execution by a computer may be object code (e.g., in a binary form that is executable more-or-less directly by a computer), source code (e.g., in a form that requires compilation or interpretation before execution), or some intermediate form such as partially compiled code. The precise forms of the program storage device and of the encoding of instructions thereon or therein are immaterial here.

The waveform may generally be configured for transmission through an appropriate medium, such as copper wire, a conventional twisted pair wire line, a conventional network cable, a conventional optical data transmission cable, or even air or a vacuum (e.g., outer space) for wireless signal transmissions. The waveform and/or code for implementing the present method(s) may be generally digital, and may be generally configured for processing by a conventional digital data processor (e.g., a microprocessor, microcontroller, or logic circuit such as a programmable gate array, programmable logic circuit/device or application-specific [integrated] circuit).

CONCLUSION/SUMMARY

Thus, embodiments of the present disclosure provide methods, apparatuses, systems, and architectures for caching tile pixel data, thus providing improved memory access bandwidth by reducing the tile memory access to a single pixel access if the tile has a pattern that repeats across all pixels in the tile.

The foregoing descriptions of embodiments of the present disclosure have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for processing a graphics surface, said surface having an array of T tiles, wherein each tile of the array of T tiles has a plurality of pixels, the method comprising:

setting a state for a pattern caching bit associated with the graphics surface, wherein the state of the pattern caching bit is configured to provide an indication as to whether a caching operation is enabled for the graphics surface;

setting P tile pattern bits, wherein each of the P tile pattern bits is associated with at least one of the T tiles; and responsive to the state of the pattern caching bit indicating that the caching operation is enabled for the graphics surface, storing V pixel values in a cache memory, wherein each of the V pixel values corresponds to at least one of the T tiles, and wherein the method further comprises determining whether all of the plurality of pixels of at least one of the T tiles of the graphics surface have a common pixel value, wherein responsive to all of the plurality of pixels of at least one of the T tiles of the graphics surface having a common pixel value, setting the pattern caching bit to an active state to provide an indication that the caching operation is enabled for the graphics surface, setting at least one of the P tile pattern bits associated with the at least one of the T tiles having the common pixel value to the active state, and setting at least one of the V pixel values corresponding to the at least one of the T tiles having the common pixel value to the common pixel value.

2. The method of claim 1, wherein the V pixel values stored in the cache memory comprise one or more blue, green, red, alpha, cyan, magenta, yellow, black, transparency, hue, saturation, brightness, intensity, luminosity, and chrominance, respectively associated with at least one of channel values or parameter values.

3. The method of claim 1, wherein to provide an indication that the caching operation is not enabled for the graphics surface, setting the state for the pattern caching bit comprises:

initializing the pattern caching bit to an inactive state; and initializing each of the P tile pattern bits to the inactive state.

4. The method of claim 1, further comprising initializing each of the V pixel values to an initial pixel value.

5. The method of claim 1, further comprising:

determining whether all of the plurality of pixels of at least one of the T tiles of the graphics surface have a common pixel value, wherein responsive to all of the plurality of pixels of at least one of the T tiles of the graphics surface having a common pixel value, setting the state for the pattern caching bit comprises setting the pattern caching bit to an active state to provide an indication that the caching operation is enabled for the graphics surface.

6. The method of claim 1, further comprising:

determining whether at least one of the P tile pattern bits of the graphics surface has been set to an active state, wherein responsive to at least one of the P tile pattern bits of the graphics surface having been set to an active state, reading one or more corresponding V pixel values from the cache memory.

7. The method of claim 1, further comprising:

determining whether all of a plurality of pixels of at least one destination tile have a common pixel value, wherein responsive to all of the plurality of pixels of the at least one destination tile having a common pixel value, writing the at least one destination tile associated with at least one of the T tiles of the graphics surface to the cache memory.

8. The method of claim 7, wherein writing the at least one destination tile to the cache memory further comprises:

setting at least one of the P tile pattern bits associated with the at least one destination tile to an active state; and setting at least one V pixel values corresponding to the at least one destination tile to the common pixel value.

9. The method of claim 1, further comprising filling an entirety of the graphics surface with a common pixel value by:

setting the pattern caching bit to an active state to provide an indication that the caching operation is enabled;

setting each of the at least one P tile pattern bits to the active state; and setting each of the at least one V pixel values to the common pixel value prior to storing the at least one V pixel values in the cache memory.

10. The method of claim 1, wherein each of the at least one of the T tiles having the common pixel value is associated with at least one source tile having a plurality of source pixels.

11. The method of claim 10, further comprising:

setting at least one source tile pattern bit associated with the at least one source tile; and storing at least one source pixel value in the cache memory, wherein the at least one source pixel value corresponds to the at least one of the V pixel values having the common pixel value.

12. The method of claim 11, wherein the common pixel value is equal to the at least one source pixel value.

13. The method of claim 11, further including:

setting the at least one source tile pattern bit to at least one of the P tile pattern bits associated with at least one of the T tiles; and copying the at least one source pixel value into the cache memory in association with at least one of the V pixel values.

14. The method of claim 10, further comprising performing a graphics operation on the at least one source tile and at least one destination tile of the graphics surface, wherein the at least one of the P tile pattern bits corresponds to at least one source tile pattern bit of the source tile and has the active state.

15. The method of claim 14, wherein each of the plurality of source pixels comprises a portion indicating a corresponding pixel of the at least one destination tile that is not to be changed, such that the graphics operation does not modify the at least one destination tile.

16. The method of claim 11, further comprising:

determining whether at least one source tile has been set to the active state, wherein responsive to a least one source tile having been set to the active state, filling at least one destination tile of the graphics surface with at least one source tile, wherein the filling at least one destination tile comprises:

reading the at least one source pixel value from the cache memory; and writing the at least one source pixel value to each corresponding pixel of the at least one destination tile.

17. The method of claim 11, further comprising:

determining whether at least one source tile pattern bit has been set to the active state, wherein responsive to at least one source tile pattern bit having been set to the active state, partially filling at least one destination tile of the graphics surface with a portion of the at least one source tile during a source copy operation, wherein the source copy operation comprises:

setting at least one of the P tile pattern bits associated with the at least one destination tile to an inactive state; and writing pixels associated with the at least one source pixel value to non-tile-aligned pixels of the at least one destination tile.

18. The method of claim 1, wherein at least one of the P tile pattern bits corresponds to a plurality of the T tiles, and wherein the method further comprises decoding the P tile pattern bits into T tile pattern bits, wherein each of the T tile pattern bits corresponds to one of the T tiles.

* * * * *